United States Patent [19]

Leclercq

[11] Patent Number: 4,522,782

[45] Date of Patent: Jun. 11, 1985

[54] FUEL ASSEMBLY FOR A NUCLEAR REACTOR

[75] Inventor: Joseph Leclercq, Saint-Didier, France

[73] Assignee: Framatome & Cie., Courbevoie, France

[21] Appl. No.: 424,772

[22] Filed: Sep. 27, 1982

[30] Foreign Application Priority Data

Oct. 5, 1981 [FR] France ............................ 81 18670

[51] Int. Cl.³ ................................. G21C 3/32
[52] U.S. Cl. ................................. 376/438; 376/449
[58] Field of Search ............... 376/445, 446, 449, 451, 376/438, 440, 441, 442

[56] References Cited

U.S. PATENT DOCUMENTS

| | | | |
|---|---|---|---|
| 3,379,618 | 4/1968 | Frisch | 376/445 X |
| 3,719,560 | 3/1973 | Mayers et al. | 376/445 X |
| 3,791,466 | 2/1974 | Patterson et al. | 376/449 X |
| 3,801,453 | 4/1974 | Jones | 376/446 X |
| 3,954,560 | 5/1976 | Delafosse et al. | 376/440 X |
| 3,971,575 | 7/1976 | Lesham et al. | 376/442 X |
| 3,992,259 | 11/1976 | Anthony et al. | 376/440 |
| 4,030,975 | 6/1977 | Anthony et al. | 376/442 |
| 4,078,967 | 3/1978 | Anthony | 376/438 X |
| 4,240,876 | 12/1980 | Delafosse | 376/434 |
| 4,284,475 | 8/1981 | Anthony | 376/446 X |
| 4,303,476 | 12/1981 | Leclercq | 376/446 |
| 4,323,428 | 4/1982 | Schallenberger et al. | 376/446 X |

FOREIGN PATENT DOCUMENTS 2493024  4/1982  France .............................. 376/446

Primary Examiner—Richard E. Schafer
Assistant Examiner—Daniel Wasil
Attorney, Agent, or Firm—Pollock, Vande Sande & Priddy

[57] ABSTRACT

Fuel assembly for a nuclear reactor comprising at least two guide tubes (6) made of a material metallurgically compatible with the material of the spacer grids (9, 10). The guide tubes (6) are fixed rigidly to the plates (8) and to the spacer grids (9, 10). The other guide tubes (7), made of a material with a low neutron capture cross section, are secured to only one of the end plates and are movably engaged in the cells of the spacer grids (9, 10) so as to be able to move with respect to these under the effect of expansion.

The invention is particularly applicable to pressurized water nuclear reactors.

7 Claims, 12 Drawing Figures

FUEL ASSEMBLY FOR A NUCLEAR REACTOR

FIELD OF THE INVENTION

The invention concerns a fuel assembly for a nuclear reactor constituted by a bundle of parallel fuel rods whose spacing is maintained by spacer grids which are transverse with respect to the rods and the support tubes which replace some fuel rods.

BACKGROUND

The support tubes or guide tubes, which are longer than the fuel rods, in cooperation with two transverse end plates, assure retention of the grids, the rigidity of the assembly, guiding of the control rods and taking up of axial forces.

In the parts of the guide tubes between the upper tip and the upper end grid and also between the lower tip and the lower end grid, axial forces are transmitted only by the guide tubes, while in the whole of the general region of the assembly located between the end grids, axial force is also transmitted by the rods.

The core in pressurized water nuclear reactors, for example, is constituted by such very long, square-sectioned assemblies.

The end plates of such assemblies are generally made of stainless steel, while the spacer grids disposed at regular intervals along the length of the assembly are generally made of a nickel alloy or a zirconium alloy.

In practice, these materials have adequate mechanical and physical properties for constituting these parts of the assembly.

In known embodiments, provision is made to fix all the guide tubes to each spacer grid so that each guide tube shares in the taking up of axial forces.

When the guide tubes and the spacer grids are stainless steel, the various parts, i.e., the end plates, the spacer grids and the guide tubes, constituting the framework of the assembly inside which the fuel rods are positioned, are easily connected by electrical welding.

Materials such as stainless steel or nickel alloys, however, are materials with high neutron capture cross sections, so that the performance of fuel assemblies including a significant mass of these materials is proportionately reduced.

The use of guide tubes made of a material with a low neutron capture cross section, such as a zirconium alloy, has therefore been proposed, e.g., in French Pat. No. 2,049,108.

The zirconium alloys used, however, cannot be welded to stainless steel and the nickel alloys respectively constituting the end plates and the assembly grids.

The French patent therefore proposes using intermediate connecting apparatuses welded onto the end plates and onto the grids and effecting mechanical attachment between the guide tubes made of zirconium alloy (Zircaloy) and these intermediate connecting parts. The latter can be sleeves made of stainless steel, for example, into which the tubes made of zirconium alloy are introduced and fitted securely.

Such an assembly includes a smaller mass of material with a high neutron capture cross section in relation to previously known assemblies, but many complex operations are involved in manufacturing it, since stainless steel sleeves must be welded into each of the cells of the spacer grids inside which the guide tubes pass, guide tubes must be introduced into these sleeves and then guide tube must be fixed in the sleeve by introducing tooling inside the guide tubes.

In addition, under irradiation, zirconium alloy tubes enlarge and expand less than the steel parts generally used for end parts, so that provision must be made in designing the assembly for this possibility of differential lengthening of the assembly in service.

The object of the invention is therefore to propose a fuel assembly for a nuclear reactor constituted by a bundle of parallel fuel rods whose spacing is maintained by spacer grids which are transverse with respect to the rods, two traverse end plates and supporting guide tubes which replace some fuel rods, and which are longer than fuel rods, rigidly fixed to the end plates and to the spacer grids, assuring retention of the grids, rigidity of the assembly, and taking up of axial forces as well as guiding of the control rods of the reactor, the end plates being made of a material with a high neutron capture cross section, such as stainless steel, this fuel assembly having a structure which allows easier and cheaper manufacture and assures adequate resistance to axial forces.

SUMMARY OF THE INVENTION

To achieve this object, the fuel assembly according to the invention comprises at least two supporting guide tubes made of a material which is metallurgically compatible with that of the spacer grids, and other guide tubes constituting the major part of the guide tube of the assembly made of a material with a low neutron capture cross section, being secured only to one of the end plates, and simply engaged in the cells of the spacer grids so as to be movable with respect to these under the effect of expansion, and insuring only the guiding of the control rods.

According to a first embodiment of the invention, the spacer grids and the supporting guide tubes fixed to these grids are made of the same material, with a high neutron capture cross section, as the end plates, for example of stainless steel.

According to a second embodiment of the invention, the spacer grids and the at least two supporting guide tubes fixed to these grids are made of a material with a low neutron capture cross section, for example of Zirconium alloy, and the at least two supporting guide tubes are fixed to the end plates by mechanical connection, for example by screwing.

Thus, though all the guide tubes serve to guide the control rods, only some of them assure the rigidity of the assembly and taking up of axial forces.

BRIEF DESCRIPTION OF THE DRAWINGS

Several embodiments of a fuel assembly for a pressurized water nuclear reactor according to the invention will now be described by way of non-limiting examples, with reference to the attached figures, to fully explain the invention.

DETAILED DESCRIPTION

Figure 1:
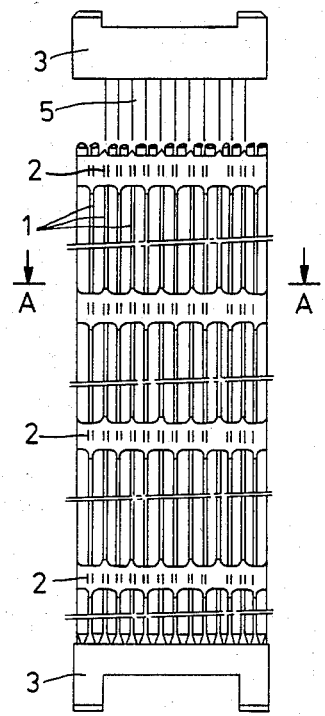
FIG. 1 is a general view in elevation of a fuel assembly for a pressurized water nuclear reactor.
Figure 2:
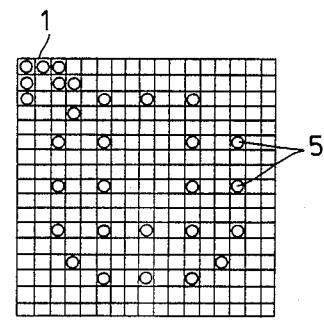
FIG. 2 is a sectional view at A—A of FIG. 1.

FIG. 1 shows a fuel assembly constituted by a bundle of parallel fuel rods 1 whose spacing is maintained by means of spacer grids 2 regularly spaced along the fuel assembly and constituting, as FIG. 2 shows, a square-mesh lattice in which some fuel rod 1 locations are occupied by guide tubes 5.

The guide tubes 5 are longer than the rods 1, so that these guide tubes can be fixed on the end plates 3 to assure the rigidity of the assembly.

The tubes 5 serve both the keep the assembly rigid and to guide the absorbant rods constituting the control rod associated with the assembly.

Figure 3:
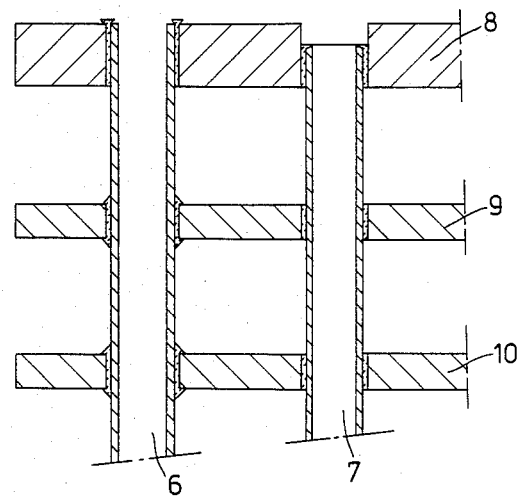
FIG. 3 is a sectional view of an assembly according to a first embodiment of the invention at a vertical plane through the upper part of two guide tubes and the connection of these tubes with the upper end plate and with the spacer grids.

FIG. 3 shows the end of two guide tubes 6 and 7 of a fuel assembly whose upper end plate, or upper tip, is made of stainless steel and whose spacer grids 9 and 10 are made of a nickel alloy with high elasticity.

The guide tube 6 is a stainless steel tube and it is connected to the spacer grids 9 and 10 and to the upper tip 8 by direct welding to these parts.

The tube 7 is made of zirconium alloy called "Zircaloy" which has a low neutron capture cross section.

This tube 7 is simply engaged in the spacers 9 and 10 and in the upper tip 8, inside openings allowing longitudinal displacement of the tube 7 with respect to these spacer grids and to this upper tip, when the tube 7 lengthens under the action of irradiation and the temperature in the reactor.

The whole assembly comprises four guide tubes made of stainless steel such as the tube 6 and twenty tubes made of zirconium alloy such as the tube 7.

At their lower part, the tubes 7 are fixed to the lower tip of the assembly, by mechanical connection.

It is therefore clear that, in an assembly such as that described with reference to FIG. 3, the mass of material with a high neutron capture cross section is therefore reduced, as twenty out of twenty-four guide tubes are made of zirconium alloy with a low neutron capture cross section.

In addition, the assembly is very easily constructed, since the four stainless steel tubes can be directly welded to the end tips and the spacer plates, without the need for intermediate parts.

In addition, free sliding of the zirconium tubes in the openings provided in the upper tip and in the spacer grids allows expansion of the zirconium tubes under irradiation to be accommodated, without lengthening of the assembly occurring.

Figure 4:
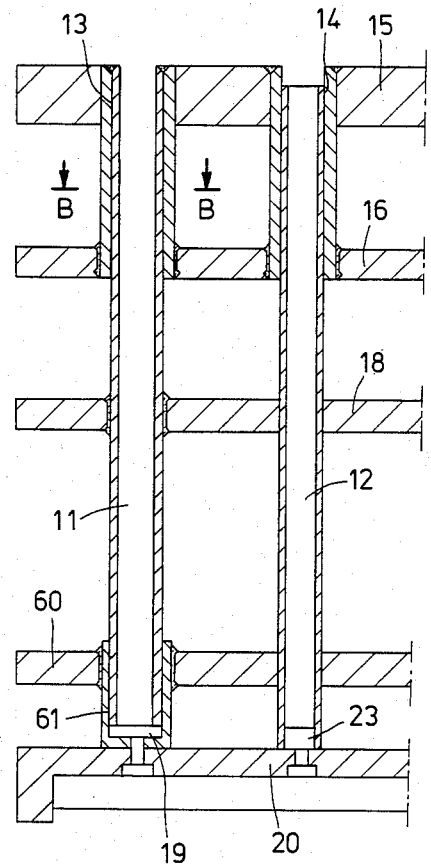
FIG. 4 is a sectional view at a vertical plane of two support tubes and the connection of these tubes with the end plates and with the spacer grids, in an assembly according to a first variant of this first embodiment.

FIG. 4 shows two guide tubes 11 and 12 engaged at their upper part in the sleeves 13 and 14 fixed by welding to the upper tip 15 and to the upper spacer grid 16 of the assembly. These stainless steel tips allow connection of the upper spacer grid and the upper tip and thus increase the rigidity and strength of the assembly with respect to axial forces.

The stainless steel tube 11 is welded at its upper part to the tip 13 and to each of the spacer grids such as 18 disposed at regular intervals over the height of the assembly.

The guide tube 12 made if zirconium alloy with a low neutron capture cross section is simply engaged in openings in the spacer grids such as 16 and 18 and in the upper tip 15.

At its lower end, the tube 11 bears a plug 19 made of stainless steel which allows it to be fixed by screw means to the lower end plate 20.

The lower end grid 60 is connected to the lower tip 20 by a sleeve 61 to which it is welded. The guide tube 11 is inserted in this sleeve. The sleeve is secured to the end plate when the tube is fixed.

The lower part of the zirconium alloy tube 12 is fixed to the lower plate 20 by means of a zirconium alloy plug 23 closing the lower end of the tube 12 and allowing the tube 12 to be fixed by screw means to the lower tip 20.

In the complete assembly, four stainless steel tubes similar to the tube 11 are used, fixed in the same way to the end tips and the spacer grids.

The other twenty tubes used are zirconium alloy tubes such as the tube 12, only fixed to the lower tip 20.

Figure 5:
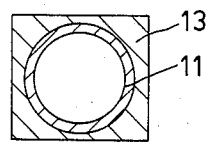
FIG. 5 is a sectional view at B—B of FIG. 4.

FIG. 5 shows that the stainless steel tip 13 is square-sectioned which allows perfect engagement of this tip in the grid 16 and very strong fixing of the tip to the grid 16 without interfering with the fuel rods thereby.

Similarly, the tips 14 are square-sectioned, allowing perfect engagement in the cells of the grid 16.

Figure 6:
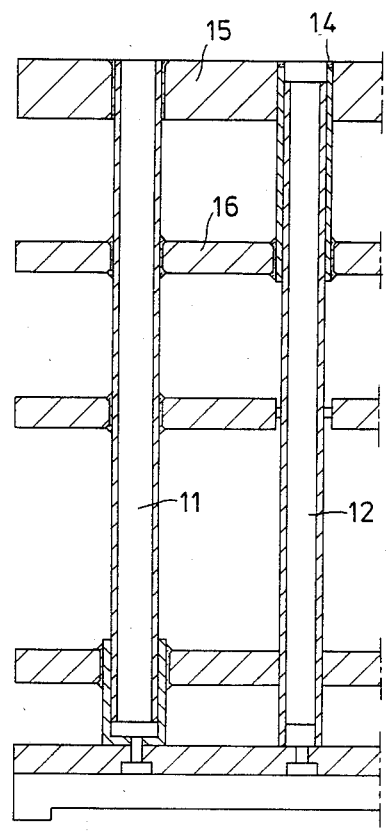
FIG. 6 is a sectional view at a vertical plane of two guide tubes and their connections with the end plates and the spacer grids, in an assembly according to a second variant of the first embodiment.

FIG. 6 shows an embodiment of the connections between the stainless steel guide tubes and the tip by direct welding of these tubes to the upper tip 15 and to the upper spacer grid 16, without using a sleeve 13.

On the other hand, the Zircaloy tubes 12 are engaged in sleeves 14 identical to those described with reference to FIG. 4, assuring connection between the plate and the upper end and the upper spacer grid.

This embodiment of the assembly allows the mass os stainless steel and therefore the absorption of neutrons by the structures of this assembly to be reduced.

Figure 7:
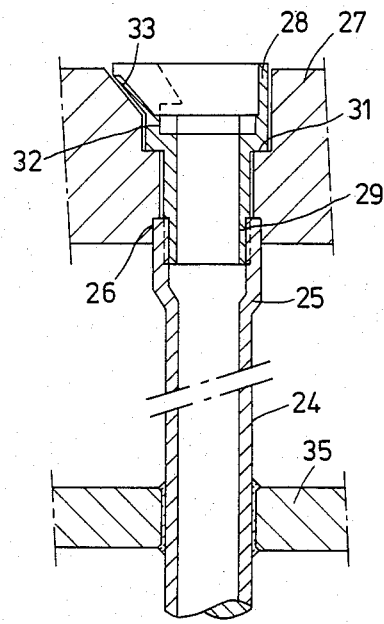
FIG. 7 is a sectional view at a vertical plane of the upper part of the guide tube, in the case of a removable assembly according to the first embodiment of the invention.

FIG. 7 shows the upper part of a stainless steel guide tube 24, assuring the rigidity of the assembly, in the case of an easily removable fuel assembly, like that described in French Pat. No. 2,368,785.

In such an assembly, the upper end of the guide tubes has widened-out, prismatically shaped part 25 which can be introduced into a recess 26 provided in the lower part of the upper tip 27, to fix the tube to this tip, by means of a hollow bushing 28 including a threaded part 29 which screws into a corresponding screw-threaded part provided on the inner surface of the part 25 of the guide tube.

The bushing 28 is engaged in an opening passing through the plate 27 and including a shoulder 31 and an upper part 32 of larger diameter than the lower part in which recesses 33 are provided, for locking the bushing rotationally by expansion of the collar constituting the upper part.

In this way, the tube is perfectly locked rotationally and fixed rigidly on the upper tip 27.

In the case of such a removable assembly, the provision of four stainless steel tubes 24 like those represented in FIG. 7, welded to the spacer grids such as 35, is all that is necessary to obtain rigid assembling of the guide tubes, spacer grids and tips, while retaining the possibility of removing the upper tip by unscrewing a bushing 28.

In an assembly with twenty-four guide tubes, the other twenty tubes are made of zirconium alloy and are only fixed to the lower tip of the assembly by plug and screw as described with reference to FIG. 4.

The zirconium alloy tubes are also introduced into openings in the spacer grids and the upper tip, allowing them to move in the event of these tubes expanding.

When the upper end plate 27 is removed, it is possible to have access to the fuel rods and to extract these selectively from the assembly, to replace or examine them.

In all cases, it is preferable to provide Zircaloy tubes which are sufficiently long for these tubes to open as near as possible to the upper face of the upper tip of the assembly. More efficient retention and guiding of these tubes is thus provided.

Figure 8:
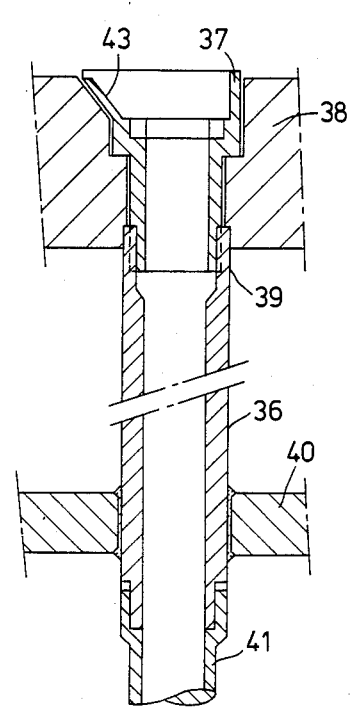
FIG. 8 is a sectional view at a vertical plane of the upper end of the guide tube, of a removable assembly, according to a second variant.

FIG. 8 shows a variant of the fixing of a stainless steel guide tube, in the case of an easily removable assembly.

A cylindrical tip 36 having a prismatically shaped upper end 39 engaged in a correspondingly shaped opening provided in the upper tip 38 is fixed.

A bushing 37 can be fixed, as before, inside the tip 36 to fix the upper plate 38 with respect to this tip 36.

The tip 36 is also fixed by welding to the spacer grids such as 40 and the stainless steel guide tube 41 is fixed by welding to the end of the tip 36, immediately below the first spacer grid 40.

In this embodiment, the connection between the upper plate and the first spacer grid 40 is thus strengthened since it is achieved by means of tips 36, of larger diameter than the guide tubes 41, which can be square-sectioned, as in FIG. 4.

As in the case of the apparatus described with reference to FIG. 7, the collar constituting the upper part of the bushing 37 can be deformed so as to enter the recesses 43 by expansion and lock the bushing rotationally.

Figure 9:
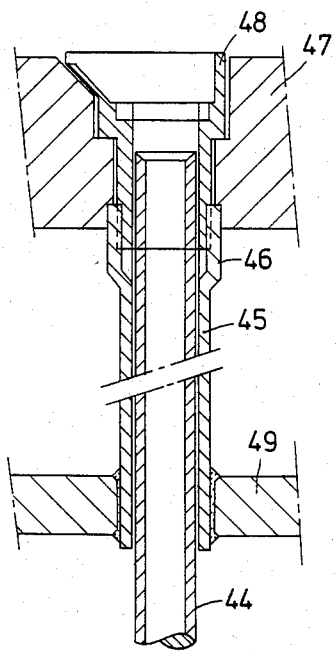
FIG. 9 is a sectional view of a vertical plane of the upper end of the guide tube, in the case of a removable assembly according to a third variant.

FIG. 9 shows a variant in mounting the zirconium alloy tubes 44 in which these are guided and held at their upper part by a sleeve 45 fixed to the upper plate of the assembly 47 through a bushing 48 which also serves to retain and guide the upper part of the tube 44.

The sleeve 45 has an upper part 46 whose outer surface is prismatically shaped to engage in a correspondingly shaped opening in the plate 47. The sleeve 45 is also connected by welding to the upper spacer grid 49 and thus forms the connection between the upper end plate 47 and this spacer grid 49.

The tubes 44 are connected at their lower part to the lower end plate of the assembly and engage in openings in the various grids of the assembly so that guiding is assured for them, while retaining the possibility of displacement of the zirconium tubes with respect to these spacer grids, in the longitudinal direction.

Figure 10:
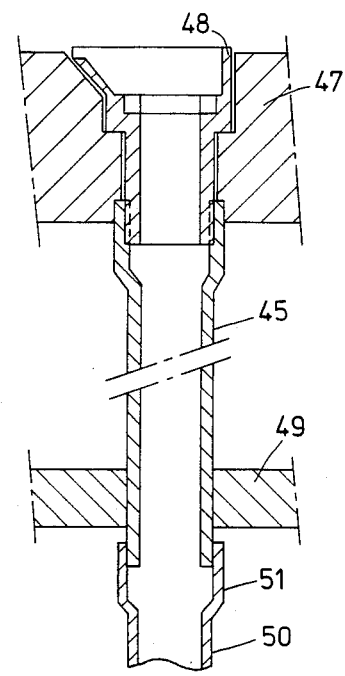
FIG. 10 is a sectional view at a vertical plane of the upper end of a guide tube, in the case of a removable assembly according to a fourth variant.

FIG. 10 shows a variant in mounting the zirconium alloy guide tubes 50 in which these have a widening 51 in their upper part in which the lower part of the sleeve 45, fixed on the upper end plate 47 by means of a bushing 48, as described with reference to FIG. 9, then engages.

This type of mounting of the zirconium alloy tubes allows sleeves with a greater thickness to be used, with a given inner diameter of guide tube and a given outer diameter of sleeve 45, since the inner diameter of the sleeves can be reduced, as it is no longer required to pass the guide tubes.

Figure 11:
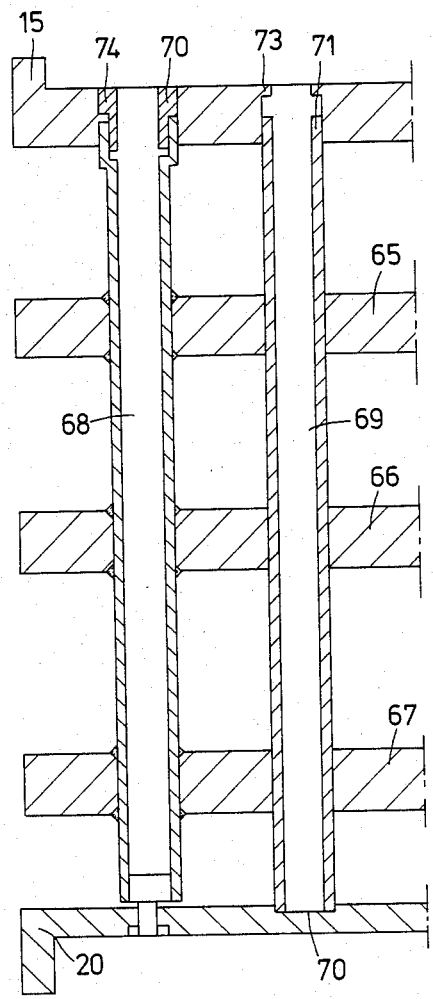
FIG. 11 is a partial sectional view at a vertical plane of an assembly according to a second embodiment of the invention.

FIG. 11 shows a fuel assembly according to a second embodiment of the invention. The spacer grids 65, 66, 67 are made of zirconium alloy (Zircaloy). The guide tubes are also made of the same alloy. The guide tube 68 is connected to the upper tip 15 in a similar way to that represented in FIG. 7, i.e., by using a hollow bushing 74 screwing into a corresponding screw-threaded part provided inside the guide tube.

Although it has not been specifically represented, connection of the guide tubes 68 to the tip can be obtained as in all the embodiments represented in FIGS. 7, 8, 9, 10, provided that care is taken to use the materials which allow the necessary welded connections to be made.

The freely mounted guide tubes 69 are also made of Zircaloy and are introduced into a blind bore 70 in the lower end plate 20 and into a bore 71 in the upper plate. At its upper end, this bore 71 includes a circular projection 73 for fixing the guide tube.

Figure 12:
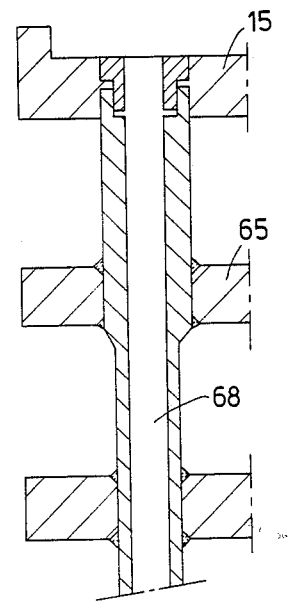
FIG. 12 is a partial sectional view of the assembly according to a variant of the second embodiment.

FIG. 12 shows an embodiment of the connection between the grid 65 and the tip 15 in which the guide tube 68 is strengthened in this part and has an outer section which is greater than its normal section over a height between its upper end and the lower level of the end grid 65. This section can be circular or square, identical to that represented in FIG. 5.

The guide tubes have the same reinforcement in their lower part, between the end grid and the lower tip.

It is clear that the apparatus according to the invention allows simplification of the structure and manufacture of the assembly, less longitudinal deformation of this under irradiation, particularly in the embodiment in which the spacer grids are made of stainless steel and a very strong structure to be obtained, despite use of a small mass of material with a high neutron capture cross section. In addition, having only a small number of connections between the guide tubes and the grids allows an improvement in the thermohydraulic conditions, since the cells adjacent to the freely mounted rods in the grids are very well irrigated.

The invention is not limited to the embodiments described; it includes all the variants thereof.

Other means of connection, removable or not, between the guide tubes and the end plates and other means of connection between the lower ends of these guide tubes and the lower end plate and thus conceivable.

The use of materials other than stainless steel for constituting the guide tubes assuring the rigidity of the assembly and other materials than zirconium alloys for the other guide tubes fixed only to the lower plate of the assembly is also conceivable.

Lastly, the fuel assembly according to the invention can be used in all nuclear reactors in which the fuel is in the form of very long rods constituting bundles of parallel rods connected together by spacer grids and end plates.

I claim:

1. Fuel assembly for a nuclear reactor constituted by a bundle of parallel fuel rods whose spacing is maintained by spacer grids which are transverse with respect to said rods, two transverse end plates and supporting guide tubes which replace some fuel rods and which are longer than said fuel rods, rigidly fixed to said end plates and to said spacer grids for assuring retention of said spacer grids, rigidity of the assembly and taking up of axial forces as well as guiding control rods of said reactor, said end plates being made of stainless steel, wherein at least two supporting guide tubes made of material which is metallurgically compatible with the material of said spacer grids are welded to the latter, while other guide tubes which also guide control rods of said reactor constituting the majority of the guide tubes of said assembly are made of zirconium alloy and are secured to only one of said end plates and slip-fitted on the cells of said spacer grids so as to be movable with respect thereto under the effect of expansion and assuring only the guidance of said control rods.

2. Fuel assembly according to claim 1, wherein said spacer grids are made of a material in the group comprising stainless steel and nickel alloys, and said supporting guide tubes are made of stainless steel and are directly welded to said spacer grids.

3. Fuel assembly according to claim 2, wherein said supporting guide tubes made of stainless steel are directly welded to said end plates.

4. Fuel assembly according to claim 2, wherein said supporting guide tubes made of stainless steel are welded to an upper end plate of said assembly through sleeves assuring joining between said upper end plate and an upper spacer grid of said assembly to which said sleeves are welded.

5. Fuel assembly according to claim 2 or 3, wherein said guide tubes made of zirconium alloy are engaged at their upper part in sleeves assuring joining between said upper end plate and said upper spacer grid of said assembly.

6. Fuel assembly according to claim 2, comprising twenty-four guide tubes, including four supporting guide tubes made of stainless steel and twenty guide tubes made of zirconium alloy.

7. Fuel assembly according to claim 1, wherein said spacer grids are made of zirconium alloy and said supporting guide tubes made of zirconium alloy are welded to said spacer grids and mechanically fixed to said end plates.

* * * * *